United States Patent Office 3,402,195
Patented Sept. 17, 1968

3,402,195
RECOVERY OF ALKYL TETRAHALOTEREPH-THALATES FROM XYLENE
Theodore M. Barna, Houston, Tex., assignor to Diamond Shamrock Corporation, a corporation of Delaware
No Drawing. Filed May 18, 1964, Ser. No. 368,411
7 Claims. (Cl. 260—475)

ABSTRACT OF THE DISCLOSURE

A lower alkyl tetrahaloterephthalate is prepared by esterifying tetrahaloterephthalyl dichloride with a lower alkanol in an alkaline medium, dissolving the crude ester product in xylene, removing lower alkanol and insoluble impurities and finally recovering the purified lower alkyl tetrahaloterephthalate from the xylene solution.

---

This invention relates to the production of biologically active materials, and more particularly to an improved method for the manufacture and purification of lower alkyl esters of tetrahaloterephthalic acids.

The lower alkyl tetrahaloterephthalates are potent selective herbicides, as disclosed in U.S. Patent 2,923,634. In particular, dimethyl tetrachloroterephthalate has proved useful for the pre-emergence control of crabgrass and other weeds.

U.S. Patent 3,052,712 discloses a method for the preparation of dimethyl tetrachloroterephthalate on a large scale. This method comprises the steps of preparing terephthalyl dichloride by fusing a,a'-hexachloro-p-xylene with terephthalic acid in the presence of a ferric chloride catalyst, chlorinating the molten product to form tetrachloroterephthalyl dichloride, and esterifying the latter with alkaline methanol or sodium methoxide. The resulting methanolic slurry is filtered or centrifuged; the solids, which contain the desired product, are washed with water and dried, and the methanolic liquid may be recycled to the esterification stage.

The product of this series of reactions is about 80% to 92% pure dimethyl tetrachloroterephthalate, with the major impurity being hexachlorobenzene (hereinafter referred to as HCB). The process is relatively economical and the product is suitable for many purposes (e.g., for control of crabgrass in turf) without further purification. There are, however, a number of disadvantages. The water wash causes a significant loss of methanol and some product loss. Handling of the solids from the filtration or centrifugation is awkward. Moreover, the product may be unsatisfactory for some purposes, e.g., the control of undesirable plant growth in food crops, owing to the possible phytotoxicity of HCB residues.

A principal object of this invention, therefore, is to provide a convenient method for the preparation of dialkyl tetrahaloterephthalates of relatively high purity.

A further object is to provide a method whereby dialkyl tetrahaloterephthalates may be prepared and recovered in maximum yield, with a comparatively high recovery of unreacted starting materials and solvents.

Still another object is to provide a method whereby lower alkyl tetrahaloterephthalates may be recovered in a highly convenient physical form.

Accordingly, this invention is directed to an improvement in the process for the preparation of a lower alkyl tetrahaloterephthalate comprising the esterification of tetrahaloterephthalyl dichloride with a lower alkanol in an alkaline medium, which improvement comprises dissolving the crude ester in xylene, removing lower alkanol and insoluble impurities and recovering the purified lower alkyl tetrahaloterephthalate from the xylene solution.

As used herein, the term "xylene" refers primarily to a mixture consisting chiefly of o-, m- and p-xylene having a specific gravity of about 0.85 to 0.90 at 20° C. and a boiling range of about 138° to 143° C. However, it will be understood to include any of the pure xylenes taken separately as well as mixtures thereof of any desired percentage composition. Further, the mixture may contain impurities such as ethylbenzene and the like.

Although the method is described hereinafter in connection with the preparation of dimethyl tetrachloroterephthalate, it is to be understood that said method may readily be adapted to any lower alkyl tetrahaloterephthalate and that the invention applies in equal degree to all such esters.

As described in U.S. Patent 3,052,712, the esterification of tetrachloroterephthalyl dichloride with methanol provides a methanolic slurry which typically contains about 1.5 to 3.5 pounds of dimethyl tetrachloroterephthalate per gallon of methanol. According to one embodiment of the present invention, the slurry is cooled to below about 30° C.; the solids are removed, e.g., by filtration; and the methanolic filtrate is recycled for further use in the esterification process or combined with the slurry therefrom. The solid filter cake, containing dimethyl tetrachloroterephthalate contaminated with HCB, residual methanol and inorganic materials from catalysts used in the various stages of the reaction, is stirred with xylene. This results in substantially complete dissolution of the organic products, while the inorganic impurities (e.g., sodium chloride and ferric hydroxide) remain in suspension.

The remaining methanol and the inorganic impurities are then removed by distillation and filtration, respectively. These two operations may be performed in any desired order; if distillation precedes filtration, methanol-soluble impurities which are insoluble in xylene may be removed along with the inorganic impurities. The methanol distillation is normally carried out at atmospheric pressure (although reduced pressures may be used if desired) and at an initial temperature of about 65° C. The temperature is gradually increased during the distillation, but it should not exceed the decomposition temperature of dimethyl tetrachloroterephthalate; in general, the maximum pot temperature should be about 140° C. The methanol thus removed may be recycled as described hereinabove.

After removal of methanol and insoluble impurities, the xylene solution is evaporated. Evaporation may be achieved, for example, by distillation or by the use of a film evaporation apparatus (e.g., a "falling-film" or "rising-film" stripping device). The evaporated xylene may conveniently be recovered and recycled for further use.

If a highly purified and virtually HCB-free grade of dimethyl tetrachloroterephthalate is desired, xylene removal is not carried to completion; instead, the solution is concentrated to the incipient crystallization point and then cooled, whereby the pure ester crystallizes. Alternatively, the solution may be evaporated to dryness and the crude product recrystallized from a suitable solvent, such as xylene or carbon tetrachloride.

If a product of somewhat lower purity is adequate, the xylene may be entirely removed and the ester (typically about 80 to 92 percent pure, the chief impurities being HCB and tetrachloroterephthalic acid) is recovered in liquid form and flaked by solidifying on a smooth surface in a thin film and then scraping the solid off the surface. Flaking devices, widely used for some time in the processing of DDT and other pesticidal chemicals, are well known in the art and a detailed description of them is not considered necessary herein.

The purification method described hereinabove has several advantages over the method disclosed in U.S.

Patent 3,052,712. For example, recovery of methanol from the filter cake is possible; manual handling of a solid product is unnecessary until the final step; and ferric hydroxide, a contaminant not removed by water washing of the product, is removed with the other insoluble impurities by filtration.

Because dimethyl tetrachloroterephthalate is soluble in methanol to the extent of about 1 to 1.5 percent, some of the product is carried off and recycled when the slurry issuing from the esterification vessel is filtered. Since this methanol must usually be purified after three or four recycles, there is always some loss of product due to decomposition during the final distillation.

According to a preferred embodiment of this invention, this loss of product is avoided by distilling the methanolic slurry from the esterification reaction and replacing the methanol with xylene either during the distillation, or before it is begun. The distillation may be started at a temperature of about 70° C., and the temperature is gradually increased as the methanol is replaced with xylene, without, however, going above about 140° C. Because of the relatively low boiling point of methanol, the distillation is preferably carried out at atmospheric pressure.

The invention is illustrated by the following examples.

EXAMPLE 1

By the reaction of tetrachloroterephthalyl dichloride with methanol, as described in U.S. Patent 3,052,712, there is obtained a slurry of crude dimethyl tetrachloroterephthalate in methanol. A portion of this slurry is filtered at room temperature and a 250-gram portion of the filter cake, containing (by analysis) 22 percent methanol, is heated with 400 grams of xylene in a distillation apparatus fitted with a packed fractionation column and variable take-off head. The methanol begins to distill when the pot temperature reaches 71° C. Distillation is continued at a reflux ratio of 4:1 until the pot temperature reaches 120° C. The methanolic distillate, collected at a head temperature of 65° to 67° C., weighs 56 grams.

The xylene-containing mixture in the pot is cooled to 100° C. and 5 grams of a commercial filter-aid product is added. Upon filtration through cotton duck cloth and washing with 200 ml. of xylene, there is obtained 82 grams of insoluble impurities containing about 25 percent xylene.

The combined filtrate and washings are distilled at atmospheric pressure and at a pot temperature of 155° C.; the pressure is then reduced to 30 mm. of mercury to remove the last traces of solvent. The molten residue is poured on a stainless steel sheet where it immediately crystallizes to form large, crisp flakes which are easily ground to a gray powder in a mortar. The yield is 146 grams of product which assays 86.5 percent dimethyl tetrachloroterephthalate.

EXAMPLE 2

This example demonstrates the use of the method of this invention in a batch-type process on a commercial scale.

A slurry of 13,000 pounds of crude dimethyl tetrachloroterephthalate in 26,900 pounds of methanol is filtered in vacuo and 21,300 pounds of methanol is recovered. This filtrate is then distilled, yielding approximately 20,000 pounds of purified methanol which is recycled to the esterification process.

The wet filter cake (containing 13,000 pounds of solids and 3600 pounds of methanol) is stirred with 21,700 pounds of xylene until all the soluble material has dissolved. The mixture is then distilled (maximum pot temperature 140° C.) until the methanol has passed over. A portion of the xylene (100 pounds) co-distills with the methanol. The pot liquid is filtered and 3000 pounds of solid impurities, mixed with 750 pounds of xylene, are recovered. The filtrate (10,000 pounds of crude product dissolved in 20,850 pounds of xylene) is passed through an evaporator where 20,400 pounds of xylene is removed. The molten product is delivered to a flaking apparatus. The yield is 10,000 pounds of a product assaying 83 percent dimethyl tetrachloroterephthalate.

EXAMPLE 3

This example illustrates a continuous process embodying this invention on a commercial scale. Capital letters used throughout the description refer to the table which follows the same.

A slurry (A) of crude dimethyl tetracholorterephthalate in methanol is filtered in vacuo; the filtrate (B) is distilled and the purified methanol (C) is recycled to the esterification process. The separated solid or product filter cake (D) is slurried with xylene (E) until all soluble constituents are dissolved, after which the insoluble impurities (F) are removed by filtration. The filtrate (G) is distilled at atmospheric pressure (maximum pot temperature 140° C.) to remove the remaining methanol (H).

The pot residue from the distillation (J) is passed to a falling-film evaporator which removes the xylene (K); the latter is recirculated to the initial dissolving step. The molten dimethyl tetrachloroterephthalate (L), assaying 83 percent pure, is flaked.

The following table gives quantities of reagents and products at each step of the process.

| Step | Substance | Quantity per hour (lbs.) |
|---|---|---|
| A | Crude dimethyl tetrachloroterephthalate | 2,120 |
|   | Methanol | 4,310 |
| B | Methanol | 3,600 |
| C | Purified methanol | 3,550 |
| D | Product filter cake: | |
|   | Crude dimethyl tetrachloroterephthalate | 2,120 |
|   | Methanol | 710 |
| E | Xylene | 6,450 |
| F | Insoluble impurities | 570 |
|   | Xylene | 64 |
| G | Dimethyl tetrachloroterephthalate | 1,550 |
|   | Methanol | 710 |
|   | Xylene | 6,360 |
| H | Methanol | 640 |
|   | Xylene | 20 |
| J | Dimethyl tetrachloroterephthalate | 1,550 |
|   | Xylene | 6,340 |
| K | Xylene | 6,210 |
| L | Dimethyl tetrachloroterephthalate | 1,550 |

EXAMPLE 4

A reactor is charged with 275 gallons of xylene and 1,212 pounds of crude dimethyl tetrahchloroterephthalate in the form of the methanolic slurry from the esterification of terephthalyl dichloride. The mixture is heated to the boiling point and the methanol is removed by distillation, the pot temperature being maintained below 140° C. The distillate comprises 188 pounds of methanol and 52 pounds of xylene.

After the distillation has been completed, the mixture in the pot is allowed to settle and the supernatant liquid is decanted through a filter into a still pot. The filter cake, containing the insoluble impurities, weighs about 35 pounds. The xylene (230 gallons) is removed by distillation to leave molten dimethyl tetrachloroterephthalate, which is then passed to a flaking apparatus. There is obtained 557 pounds of flaked dimethyl tetrachloroterephthalate, which assays 86.4 percent pure.

Although the invention has been described with specific reference to particular embodiments thereof, it is not to be so limited, since changes and modifications therein may be made which are within the full intended scope of this invention as defined by the appended claims.

What is claimed is:

1. In the method for the recovery of lower alkyl tetrahaloterephthalates, wherein said tetrahaloterephthalates are prepared by esterifying tetrahaloterephthalyl dichloride with a lower alkanol in an alkaline medium, and thereafter said tetrahaloterephthalates are recovered by removing the lower alkanol and inorganic impurities therefrom, the improvement in said recovery which comprises establishing a solution of said tetrahaloterephthalate, said lower alkanol and the inorganic impurities in xylene, removing the lower alkanol and said impurities from the solution by distillation and filtration respectively, and recovering the lower alkyl tetrahaloterephthalate from xylene by evaporation.

2. The method of claim 1 wherein the lower alkanol is methanol and the lower alkyl tetrahaloterephthalate is dimethyl tetrachloroterephthalate.

3. The method of claim 2 wherein the major portion of the methanol is removed by filtration before the xylene is added.

4. The method of claim 2 wherein the major portion of the methanol is removed by distillation after the xylene is added, said distillation being carried out at a maximum pot temperature of about 140° C.

5. The method of claim 2 wherein the insoluble impurities are removed by filtration.

6. The method of claim 2 wherein substantially all of the xylene is removed from the dimethyl tetrachloroterephthalate by evaporation and said dimethyl tetrachloroterephthalate is flaked.

7. The method of claim 2 wherein the xylene solution is concentrated and dimethyl tetrachloroterephthalate of high purity is recovered by crystallization therefrom.

References Cited

UNITED STATES PATENTS 3,052,712    9/1962    Zinn et al. _____ 260—475

LORRAINE A. WEINBERGER, *Primary Examiner.*

T. L. GALLOWAY, *Assistant Examiner.*